(12) United States Patent
Lambert

(10) Patent No.: US 6,816,143 B1
(45) Date of Patent: Nov. 9, 2004

(54) SELF DIAGNOSTIC AND REPAIR IN MATRIX DISPLAY PANEL

(75) Inventor: Nicholaas Lambert, Waalre (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 607 days.

(21) Appl. No.: 09/447,544

(22) Filed: Nov. 23, 1999

(51) Int. Cl.[7] .................................................. G09G 3/36
(52) U.S. Cl. ............................ 345/93; 345/100; 345/99
(58) Field of Search ............................ 345/93, 100, 90, 345/98, 99, 904; 324/770

(56) References Cited

U.S. PATENT DOCUMENTS

| | | | | |
|---|---|---|---|---|
| 5,063,378 A | * | 11/1991 | Roach | 345/90 |
| 5,157,386 A | * | 10/1992 | Uchida et al. | 345/211 |
| 5,465,053 A | | 11/1995 | Edwards | 324/770 |
| 5,555,001 A | | 9/1996 | Lee et al. | 345/93 |
| 5,619,223 A | * | 4/1997 | Lee et al. | 345/100 |
| 5,781,171 A | | 7/1998 | Kihara et al. | 345/93 |
| 5,923,512 A | * | 7/1999 | Brownlow et al. | 324/770 |
| 5,926,156 A | * | 7/1999 | Katoh et al. | 345/100 |
| 5,956,008 A | * | 9/1999 | Kawasaki et al. | 345/100 |
| 6,191,770 B1 | * | 2/2001 | Kim | 324/770 |

* cited by examiner

Primary Examiner—Jimmy H. Nguyen

(57) ABSTRACT

A matrix access system having a plurality of columns, comprising a plurality of circuits each being adapted for selectively accessing one of said columns; an interface, communicating data with said plurality of circuits; at least one redundant circuit, adapted for selectively accessing each of said columns and communicating data with said interface; a test circuit, for comparing data communicated by a respective one of said circuits and said redundant circuit; and means for selectively logically replacing a respective circuit with said redundant circuit.

10 Claims, 3 Drawing Sheets

SELF DIAGNOSTIC AND REPAIR IN MATRIX DISPLAY PANEL

FIELD OF THE INVENTION

The present invention relates to the field of self-repair of matrix accessed integrated electronics systems, and more particularly to matrix display panels with integrated drivers capable of self-diagnostic and repair through the use of redundant driver circuitry.

BACKGROUND OF THE INVENTION

The integration of column drive circuits on a silicon display panel potentially reduces the cost of display systems, but may also reduce the panel fabrication yield substantially. This is the obvious result of the inclusion of sensitive small geometry active circuit elements on the substrate.

One of the advantages of building a reflective active matrix projection display with liquid crystal on silicon is that the drivers can be integrated with the active matrix itself. This should improve performance and reliability, and lower the total system cost. By integrating the digital to analog conversion on the display panel, a purely digital interface can be provided, reducing the burden imposed by traditional analog data inputs with respect to the high data rates that are required for high resolution, high refresh rate and single panel color sequential operation. Therefore it is advantageous in performance and system cost to have digital data inputs on the panel, and integrate any required digital to analog conversion in the column drive circuits.

Of course this adds to the total amount of active circuitry on the panel. In general, this will have a negligible effect on die size: The minimum die size is mostly determined by the size of the active matrix, a border area for sealing the liquid crystal cell and bond pads. Typically, most if not all of the data conversion and drive circuits can coincide with the border sealing area.

However, a large active circuit area may increase the chances for production defects substantially. In the case of active matrix display panel systems, the yield estimate for the large area of the active matrix has to be evaluated differently than the more standard circuit area. See, S. M. Sze, editor, "VLSI Technology", McGraw-Hill, Tokyo, 1983 (ISBN 0-07-066594), Chapter 14 by W. J. Bertram, "Yield and Reliability". See also, (Betty Prince: "Semiconductor Memories", John Wiley & Sons Ltd., Chichester, England, 2nd Edition, 1991, ISBN 0471924652). The pixel circuits in the active matrix are generally less sensitive to defects because they involve relatively few types of components at relatively low density. In addition, some pixel defects are generally acceptable as long as they result in dark point defects in the image. Defects in the data conversion and driver circuitry, however, typically cause one or more rows or columns to fail, a result that is unacceptable. Therefore, when the dense active circuit area for data conversion and drivers increases, the production yield may be adversely affected, which raises the cost.

One way to improve the yield of the data conversion and drive circuits is to make use of the fact that it consists of large numbers of identical circuits. This means that it is possible to provide additional (spare or redundant) drive circuits that can selectively take over the function of a defective drive circuit. See, e.g., U.S. Pat. Nos. 5,465,053, 5,781,171 and 5,555,001, expressly incorporated herein by reference. This technique is somewhat similar to the repair of large memories in standard production industry practice.

In the case of memory devices (see also U.S. Pat. No. 5,555,001), the actual circuit repair is performed during factory testing: a faulty circuit is detected during testing, and the functionality of the defective circuit is replaced by a spare circuit by means of programmable circuit fuses. This takes valuable time and the mechanics of the fuse programming may be difficult to implement. In liquid crystal on silicon display devices, the circuitry is covered with an integrated light shield to prevent malfunction due to leakage currents induced in the silicon by the intense projection light. Therefore, standard laser activated fuse programming is difficult to perform. Another reason is that the blowing of a fuse may actually create damage to the die surface that can easily compromise the tight tolerances on the narrow gap of liquid crystal cell on top of it.

The prior art of display panel devices therefore teaches either to minimize the amount of driver circuitry on the device, which is more sensitive to defects than the display pixels themselves, or to provide a circuitry repair scheme which is implemented during the later stages of manufacturing of the device.

SUMMARY OF THE INVENTION

The column drive circuitry for a matrix display consists mostly of a large number of identical circuits, one for every column. By providing at least one spare column driver and a control circuit within each block of drivers, the system can automatically detect and identify faulty column drivers, which are then functionally replaced with a spare driver. Thus, with the addition of a small amount of extra circuitry, the effective yield can be improved.

In one embodiment, the output of the normal column drivers are systematically compared with the output of a spare column driver, to detect flawed normal column drivers, for example during a power on self test or continuously during operation. In the event of detection of an error, the spare column driver substitutes its output for the output of the defective normal column driver. In a second embodiment, the output of each adjacent pair of column drivers are compared for the same input signal. The column driver under test is disconnected from its associated column, while the adjacent, and all "higher" column drivers are switched to be associated with the column of the "lower" adjacent column driver circuit. In the case of a difference, the "higher" column driver is presumed to be operative, and persistently substitutes for the "lower" column. If the column drivers both produce the same output signal (within a specified tolerance), the scan and test circuit proceeds to test the next adjacent pair of column drivers, with all column drivers "lower" than the column driver under test being connected to their associated column. A spare column driver circuit is provided at the "higher" end of the block, so that if one column driver defect is identified, each column is still provided with an operative driver circuit. In this way, a defective column driver per block does not impair overall device functionality.

In essence, the first and second techniques may be expanded to an increased number of spare column drivers per block. In the first instance, the output of each spare column driver circuit must be individually multiplexed to be able to substitute for the output of each of the normal column driver circuits. In the second instance, the simple adjacent neighbor test must be expanded to a neighborhood test for a larger number of column driver circuits. It is also possible to employ both methods simultaneously to provide two or more spare column drivers per block.

The statistical basis for a projected improvement in fabrication yield is that the likelihood of an error in any of the normal column drivers far exceeds the likelihood of an error in the spare column driver and scan and test circuitry. For example, if there are 101 column drivers in a block (100 normal and one spare), and each has the same probability for defect, then the spare driver is only about 1% as likely to be defective as all the other column drivers together. If the additional circuitry overhead for the scan, test and replace is, for example, 5% (with similar defect sensitivity to the driver circuit itself), then the overall improvement in yield will be about 18 times, with respect to column driver defects. As stated above, the wafer area cost is not significant, because this circuitry typically is provided in a wafer region that has a mechanical function as well, and thus the wafer size is not substantially reduced if the circuitry is minimized.

Depending on the defect probabilities, block sizes, and the like, it may be desirable to provide a plurality of spares for each block. In this case, multiple column driver defects within a block may be corrected, at the cost of further overhead circuitry and spare column drivers. Typically, a point of diminishing return is reached with increasing complexity, as the repair circuitry itself is also susceptible to defects and has a cost.

Therefore, in a preferred embodiment, a single spare column driver is provided in a block of size which is likely to have only zero or one defects, and is unlikely to have two or more defects. The block size is therefore limited accordingly. Typically, however, the block size is constrained by other performance and fabrication constraints, and the scan, test and replace circuitry is designed to meet these constraints.

The system according to the present invention provides the ability to improve effective yield in typical panel display systems, such as reflective liquid crystal on silicon, without substantially increasing device cost or complexity.

The use of spare driver circuits for repair is especially useful when the driver circuit contains a substantial amount of digital circuitry. For example, in display panel devices having an analog reference ramp digital to analog converter scheme, an incoming digital data signal is converted into analog column voltages on the panel. In this design, a global analog ramp signal is generated every row period. Each column tracks the global analog ramp signal until it reaches a voltage corresponding to the desired gray scale. It then stops tracking the analog reference ramp and holds its voltage until the end of the row period. The digital data are converted into simultaneous, pulse width modulated signals, one for each individual column. The pulse width modulated signal controls the analog track-and-hold switch between the display column and the global analog ramp signal. In this way, the digital video data are converted into analog voltages on the columns. In a known embodiment of this system, for example, each column driver has about 300 active transistors.

Other known column drive schemes also have column drivers that are susceptible to defects. In likewise manner, the present techniques may be employed to correct defects for these other types of systems.

The present invention improves the known concept of circuit self-repair. In a system according to the present invention, immediately after power-up, an image from the display panel may show a column drive defect transiently, but then the system automatically detects the faulty driver circuit and functionally replaces it with the spare circuit. For display applications, it is generally acceptable for the circuit to start up with faulty behavior; as long as the self-repair is done quickly, for example in a fraction of second. Thus, in contrast to typical memory and generic semiconductor devices, certain significant errors are tolerable, and thus more leeway is available for real-time scan and replace systems to operate. For example, it is not required that the system detects an error before it has an effect on system output, rather, the system must detect the error before it has a repeated and static effect on the system.

It is also noted that it is possible that during use, a column driver circuit defect will become apparent, i.e., an intermittent defect. In this case, the spare circuit will also be available to replace the defective driver circuit in real time. Once an error is detected, typically the spare driver will persistently replace the defective driver, for example until the system is reset. It is also possible, however, to retest the column periodically for continued defect, allowing the spare column driver to be freed in the event that the defect is no longer apparent.

It is possible that the spare column driver circuit or its associated scan and test circuitry may be defective. This may be determined or presumed if a large number (e.g., two or more in a system having a single spare) regular column driver circuits test as defective. In this case, the scan and test circuit may determine this type of event and cease all scan, test and repair activity. In this case, therefore, the scan and test circuit determines that either more column drivers are defective than can be repaired, or that the scan and test circuitry itself is defective. In the later case, by disengaging this circuitry, it is possible that an otherwise functional block remains. The added circuitry for this embodiment therefore includes a counter driven by the output of the comparator, which detects greater than a threshold number of defects, to presume that the scan and test or spare column driver circuit is itself defective.

In principle, for each block of column drivers, one or more spare column driver circuits are provided, and employed in conjunction with a simple column scanning scheme. A spare driver circuit is programmed to load the same input data as the currently selected column circuit. After processing a data value, the output of the normal circuit is compared with output of the spare circuit. If the spare and normal circuits produce identical results, as determined, for example, by a digital or analog comparator, the normal circuit is assumed to be correct, and the spare circuit is programmed to test the next column, and so on. When the output of a normal circuit is not equal to the output of the spare circuit, however, it is assumed that the normal circuit has a defect and should be replaced or substituted. Preferably, during the test, the spare column driver takes over driving the output for the display column, so that if the normal circuit fails, the scan can simply cease and the spare driver circuit remain in that configuration.

Therefore, if there is only one spare circuit, in the event of detection of a defective column driver circuit, the scanning for faulty columns is stopped, and the spare column circuit is programmed to take over the functionality of the faulty circuit, preferably permanently. If multiple spares are available, a subsequent spare may be employed to test additional columns, using either the same scanning circuitry or dedicated scanning circuitry for each spare column driver. The repair scheme therefore consists of a continuous scan and compare, using the incoming data ported to a redundant circuit. Where a difference is found between output of the spare (redundant) circuit and a normal circuit, the spare circuit replaces the faulty circuit.

The spare column driver is preferably nearly identical to a normal column driver, with the exception of the scan, test and replace components. However, it may be desired to tweak the components or parameters thereof to improve device performance. For example, the spare column driver in the aforementioned first embodiment may be required to drive a highly loaded output due to the multiplex and switch circuitry. Therefore, the spare driver circuit may be appropriately configured to account for this increased output load.

In a typical implementation, there would be a spare circuit for every block of circuits driving a plurality of columns. This block plus spare is then duplicated several times to drive all columns of the panel. The size of the block depends on layout and routing issues, and yield statistics. For a typical block size of the order of 100 columns per block, the area overhead of a spare circuit and associated scanning mechanism per block is only a few percent. Note that part of the scanning control logic can be implemented globally, for all blocks in parallel, as long as the actual fault detection and scan-stop mechanism is local for each block.

In contrast to techniques employed in the repair of memories, it is not possible to swap a defective column or row of the active matrix itself with a spare one on the side: the image has to be spatially consistent. The repair of matrix display panels therefore concentrates on the drive circuit itself. Therefore, it is important that the column circuits are largely independent of each other. If one column driver circuit fails, it should not affect the functionality of other column circuits.

For example, the data distribution from input to column circuits are preferably bus-oriented, not shift register orientated. In a shift register arrangement, if a single element of a shift register fails, its faulty output is passed to all subsequent registers in the shift chain. If, on the other hand, a single receiving element on a data bus fails, it will in general not affect the functionality of other receiving elements on that bus. This property gives the bus-oriented data distribution a much better possibility for repair than the shift register based one.

In implementation, the scan and test circuit may be centralized, with a "star" type architecture. Alternately, portions of the circuit may be distributed. For example, a comparator circuit may be provided in conjunction with each normal column driver, with a block-global detection of a fault, which reduces the need for a complex multiplexer. Of course, any defect in any comparison circuit may adversely impact the system operation, and therefore limits the efficiency gains possible.

In a bus topology for data distribution to the column drivers, one embodiment of the invention provides a simple shift register that shifts a single select pulse along the array of drivers tied to the input data bus. This is a very simple and area efficient solution, and because it is small, the likelihood of defects is also small, at least much smaller than the likelihood of defects in a shift register for every data bit. In a spare-insertion scheme using this single select pulse, e.g., according to the first embodiment, the spare column driver circuit is simply triggered by a counter, which, for example, keeps track of the tested/defective column index, to retrieve its data from the same input data bus. In a column-shift repair scheme, e.g., according to the second embodiment, the defective column is simply skipped.

The comparator for comparing the outputs of the column driver under test and the spare column driver may be of standard type, and may be provided as an integrated portion of the electronics, or as a discrete component. Alternately, various simplifying presumptions may be applied to reduce the complexity of the comparator and/or increase the compatibility with the fabrication processes employed to facilitate an integrated comparator. It is noted that the column driver circuit is typically a dual voltage circuit; a logic level circuit which prepares the image signal for display and a higher voltage circuit adapted to fully modulate the display pixels. For example, the higher voltage outputs are typically medium voltage, e.g., 12–20 Vpp. Since most of the column drive circuit complexity resides in the logical processing of the image signal, and only a relatively small number of the devices that operate at higher voltages, and therefore have relatively large features and are relatively less sensitive to certain types of defects, the comparator may be a logic level digital device which operates on the later stages of the logic signal processing only. In the event that the comparator operates on the medium voltage output drive signal itself, the test circuit and associated circuitry, including the multiplexer and comparator should also be able of handling signals of this type. For example, a switched capacitor design may be provided. It is also noted that some display panel designs provide full digital image signal processing, delivering a digital signal to each pixel to control the display. Therefore, it is not necessary that the test circuit include analog components or medium voltage components.

Since under certain circumstances it may be presumed that the voltage translator circuit has a low probability of defect, the column driver scan, test and replace may operate on the logic voltage level portions only, substituting the output of the spare column driver to the control input of the voltage translator. In this case, the testing and comparison of the column driver circuit is a purely digital process, requiring, for example, only an exclusive OR (XOR) type gate or detector to detect differences in signals.

In cases where it is useful or appropriate to monitor and test the analog output of the column driver circuit, the test itself need not examine the analog voltages. For example, since each column driver circuit produces a ramp and hold output signal, the characteristic timing of this signal may be extracted from the analog output of the column driver under test and used as a surrogate for the analog levels of the signal itself. This is useful in instances where it is unlikely that the column driver output will retain normal timing characteristics yet be substantially defective. Therefore, it is understood that the comparator may be an analog device, a digital-analog hybrid device or a digital device, depending on the circumstances of the test.

It is also noted that the present invention is not limited to systems that integrate column drivers into the display matrix panel. The same issues arise with other types of display systems wherein the driver electronics are not integrated with the display, but are, e.g., interfaced during assembly. Therefore, the present invention allows automated testing and repair of both integrated and discrete driver matrix display systems.

It is therefore an object of the invention to provide a matrix access system having a plurality of columns, comprising a plurality of circuits each being adapted for selectively accessing a column; an interface, communicating data with the plurality of circuits; a test circuit for comparing an operation of a first and second circuits to determine an equivalence of function with respect to communicated data; and means for selectively accessing a respective column with either the first or second circuit in dependence on the compared equivalence.

These and other objects and features of the present invention will become more fully apparent from the following description and appended claims taken in conjunction with the accompanying drawings.

BRIEF DESCRIPTION OF THE DRAWINGS

For a better understanding of the invention, reference is made to the drawings, which are to be taken in conjunction with the detailed specification to follow.

DETAILED DESCRIPTION OF THE PREFERRED EMBODIMENTS

Figure 1:
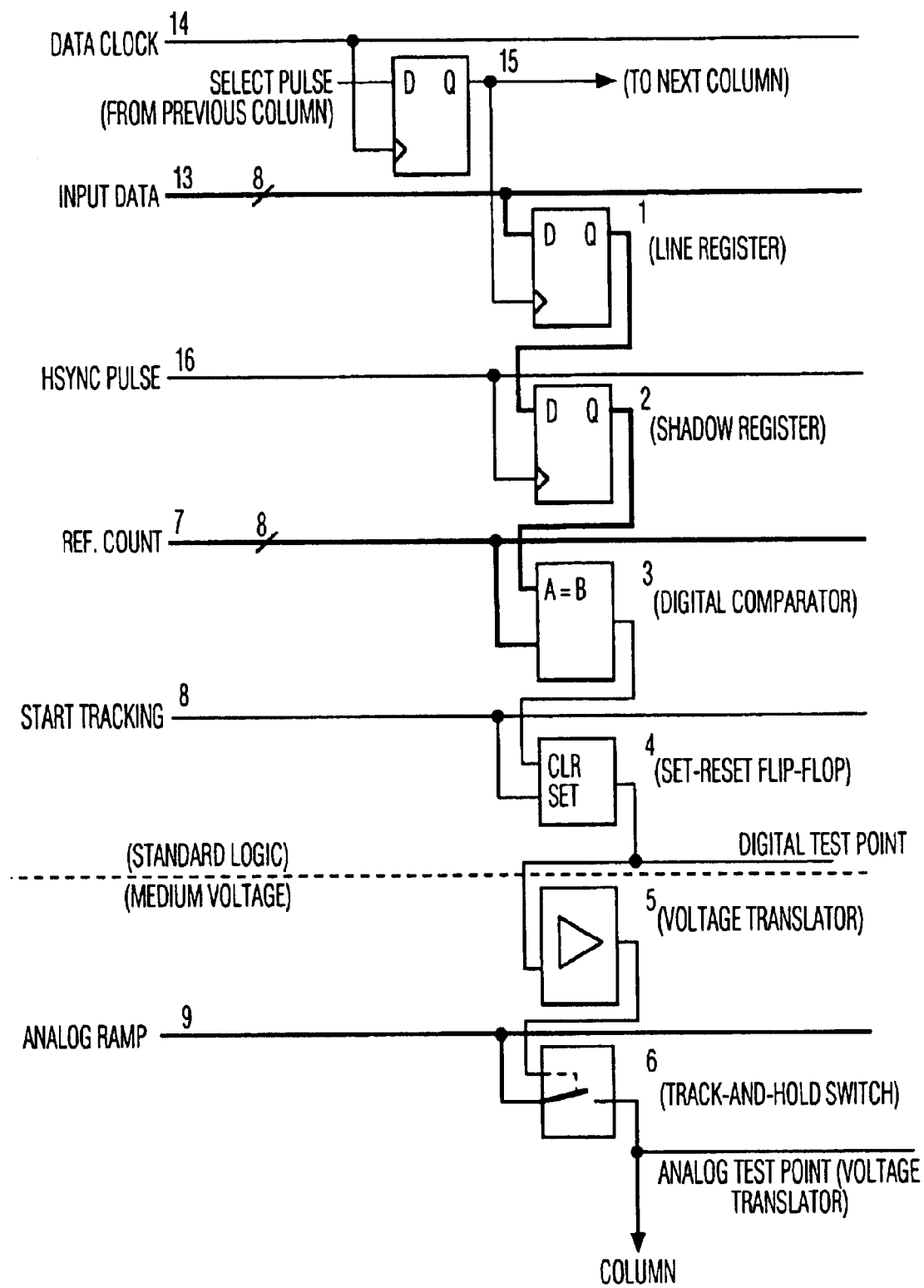
FIG. 1 shows a block diagram of a column driver circuit.

The invention will now be described by way of the drawings, in which corresponding reference numerals indicate corresponding structures in the figures.

EXAMPLE 1

Figure 2:
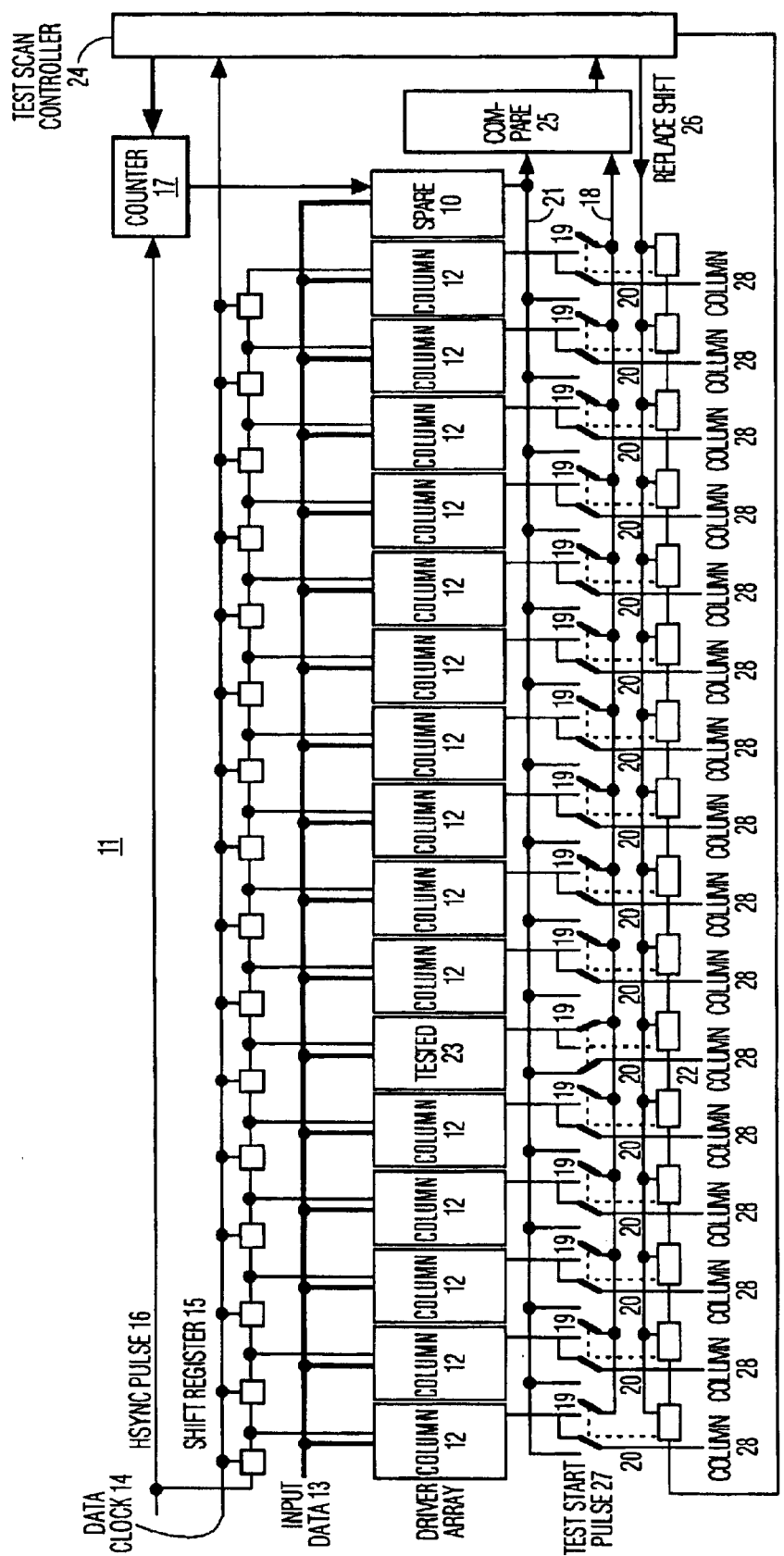
FIG. 2 shows a first embodiment according to the present invention.

According to a first exemplary embodiment of the invention, a spare column driver circuit 10 is provided for a block of column drivers 11, as shown in FIG. 2. Each column driver circuit 12 is relatively standard, having a data line register 1, a shadow register 2, digital comparator 3 and set-reset flip-flop 4, a voltage translator 5 and track-and-hold switch 6 as shown in FIG. 1. An input data bus 13 delivers the gray scale input data signal to each column driver circuit 12. The input data is stored in the line register 1 during the remainder of the line period. At the end of the line period, when all columns have been loaded with the proper gray scale input data, the data are transferred to the shadow register 2, controlled by global horizontal synchronization (Hsync) pulse 16. When the data from the shadow register 2 is equal to the value of global reference count 7, the digital comparator 3 clears the set-reset flip-flop 4, signifying the "end-of-tracking" or "hold" condition for the column driver circuit 12. At the start of each line period, the global "Start tracking" signal 8 sets the "Tracking" condition again in set-reset flip-flop 4. In this manner the shadow register 2, digital comparator 3 and set-reset flip-flop 4 convert the binary gray scale data into a pulse width modulated control signal. The voltage translator circuit 5 translates the modulated control signal, having a logic voltage level, e.g., 5V, into an analog voltage having a maximum value in excess of the logic voltage level, e.g., 12–20 Vpp. The track-and-hold switch 6 passes the global analog ramp signal 9 to the column until the proper gray scale is met, as controlled by the pulse width modulated control signal.

A data clock 14, horizontal synchronization pulse 16, and shift register 15 generate the necessary address signal for each column driver circuit 12 to selectively read the appropriate data signal. The horizontal synchronization pulse 16 also provides an input to counter 17. The output generated by each column driver 12 is (n:1) multiplexed onto a test line 18 by multiplexer circuits 19, and further (2:1) multiplexed by multiplexer circuits 20 with the output 21 of the spare column driver 10 to the column drive line of the column drive circuit 23 under test. During the test of a column, the multiplexers 19, 20 are controlled so that the output of the column drive circuit under test 23 is multiplexed onto test line 18, to comparator 25, whose output is received by the test scan controller 24. The output of the spare column driver circuit 10 is used to drive the column 22 corresponding to the column drive circuit 23 under test.

Multiplexers 19 and 20 are driven by control signals from the test scan controller 24 passed through shift register 26. A test start pulse 27 input is also provided by a test scan controller 24.

A test scan controller 24 and the counter 17 control the scan and test. The spare column 10 loads the data value of the column driver under test 23 in parallel. The output of the column driver under test 23 is multiplexed onto a test line 18 by switches of multiplexer 19, 20. Since the output of the column driver 12 is an analog medium voltage (e.g., 12–20 Vpp), the multiplexer 19, 20 generally comprises a pair of complementary transistors arranged as a transmission gate. The multiplexed line 18 is fed to an analog comparator 25, and compared against the output 21 of the spare column driver 10. If the yield loss due to voltage translators 5 and track-and-hold switches 6 is relatively small, the entire repair scheme can be done at logic levels only. For example with digital a multiplexer, a digital test comparator and spare circuit all operating at the logic output from the set-reset flip-flop 4 of each column circuit.

If the comparator 25 determines that the column driver circuit 23 under test is defective, the scan operation ceases, and the column driver circuit under test 23 is persistently functionally replaced with the spare column driver circuit 10. If the comparator 25 determines that the column driver circuit 23 under test is not defective, the scan operation continues, and the adjacent column driver circuit 12 is tested against the spare column driver circuit 10. This process continues serially until all column driver circuits 12 are tested, and may repeat continuously unless and until a defective column driver circuit 12 is identified.

EXAMPLE 2

Figure 3:
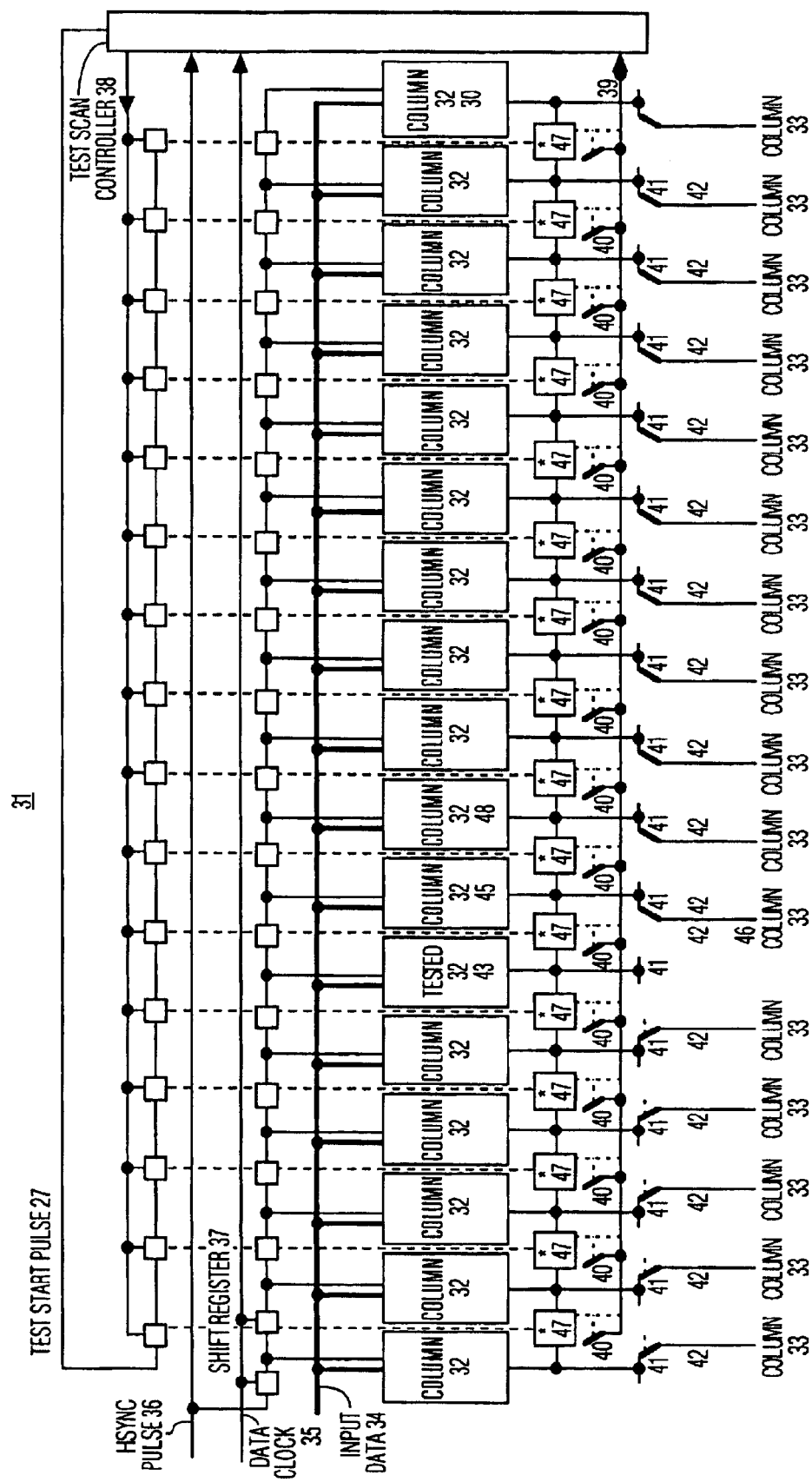
FIG. 3 shows a second embodiment according to the present invention.

FIG. 3 shows a second exemplary embodiment of the invention. According to the second embodiment, a spare column driver circuit 30 is provided within a block of column drivers 31. The column drivers 32 are similar to the column driver circuits 12 described in Example 1, and shown in FIG. 1.

A data bus 34 delivers the data control signal to each column driver 32. A data clock 35, horizontal synchronization pulse 36, and shift register 37 generate the necessary address signal for each column driver circuit 32 to selectively read the appropriate data signal. The horizontal synchronization pulse 36 also provides an input to test scan controller 38. The output generated by each column driver 32 is (n:1) multiplexed onto a test line 39 by multiplexer circuits 40, and further (2:1) multiplexed by multiplexer circuits 41 with the output of an adjacent column driver 32 to a respective column drive line 42 of the column drive 32. A relatively simple comparator 47 is provided for each respective column driver circuit 32, linked to the output of an adjacent column driver circuit 32. The comparator 47 may be a logic level digital device operating on the data from, for example, the set-reset flip flop 4, or a medium voltage analog device operating on the output of the track and hold switch 6.

A test scan controller 38 controls the scan and test. One set of adjacent column driver circuits 43, 45 loads the same column data value. During the test of a column driver circuit 43, the multiplexers 40, 41 are controlled so that the output of a comparator 44, which compares the output of column driver circuit 43 under test with the adjacent column driver circuit 45, is multiplexed by multiplexer 40 onto test line 39, to the test scan controller 38. The output of the adjacent column driver circuit 45 is used to drive the column 46 corresponding to the column driver circuit 43 under test. Multiplexers 40 and 41 are driven by control signals from the test scan controller 38 passed through shift register 37. Since the output of the comparator 44 is a digital signal, the multiplexer 40 may be, for example, a simple NAND gate driven with logic voltage levels.

If the comparator 44 determines that the column driver circuit 43 under test is defective, the scan operation ceases, and that column driver circuit 43 is persistently functionally replaced with the adjacent column driver circuit 45. In this case, the spare column driver circuit 30 is used to drive the last column 33 in the block. If the comparator 44 determines that the column driver circuit 43 under test is not defective, the scan operation continues, and the adjacent column driver circuit 45 is tested against its adjacent column driver circuit 48. This process continues serially until all column driver circuits 32 are tested, and may repeat continuously unless and until a defective column driver circuit is identified.

To further explain the principal difference between embodiments in example 1 and example 2, we can compare their operation as follows: In example 1, a defective circuit is replaced by a spare circuit. In example 2 a defective circuit is rather skipped: each successive column in the sequence replaces its predecessor.

While the above detailed description has shown, described and pointed out the fundamental novel features of the invention as applied to various embodiments, it will be understood that various omissions and substitutions and changes in the form and details of the system and method illustrated may be made by those skilled in the art, without departing from the spirit of the invention. Consequently, the full scope of the invention should be ascertained by the appended claims.

What is claimed is:

1. A matrix access system having a plurality of columns, comprising:

(a) a plurality of circuits each being adapted for selectively accessing one of said columns;

(b) an interface, communicating data with said plurality of circuits;

(c) at least one redundant circuit, adapted for selectively accessing each of said columns and communicating data with said interface;

(d) a test circuit, for comparing data communicated by a respective one of said circuits and said redundant circuit; and (e) means for selectively logically replacing a respective circuit with said redundant circuit.

2. The matrix access system according to claim 1, wherein each of said columns transmits a signal representative of a grayscale level of an active matrix display pixel.

3. The matrix access system according to claim 1, wherein said plurality of circuits each translate a binary data control signal having a logic voltage level into a voltage having a maximum value in excess of the logic voltage level.

4. The matrix access system according to claim 1, wherein said plurality of circuits are each integrated onto a common substrate with a matrix panel display device.

5. The matrix access system according to claim 1, wherein said interface comprises a common data bus.

6. The matrix access system according to claim 1, wherein said plurality of circuits each produce an analog output.

7. The matrix access system according to claim 1, wherein said at least one redundant circuit is provided as an additional one of the plurality of circuits in series therewith.

8. The matrix access system according to claim 1, wherein said test circuit operates on an analog signal produced by each of the plurality of circuits.

9. The matrix access system according to claim 1, wherein said means for selectively logically replacing a respective circuit with said redundant circuit comprises a multiplexer for selectively directing an output of said redundant circuit to functionally substitute for any one of the plurality of circuits.

10. The matrix access system according to claim 1, further comprising a scan control for controlling a testing, with said test circuit, of said plurality of circuits with said at least one redundant circuit.

* * * * *